(12) United States Patent
Renz et al.

(10) Patent No.: US 8,066,493 B2
(45) Date of Patent: Nov. 29, 2011

(54) INFLATION ASPIRATOR WITH COLLAPSIBLE BARREL

(75) Inventors: Robert Renz, Phoenix, AZ (US); Roland Dwight Hintzman, Desert Hills, AZ (US); Haiwen Meng, Phoenix, AZ (US)

(73) Assignee: Goodrich Corporation, Charlotte, NC (US)

( * ) Notice: Subject to any disclaimer, the term of this patent is extended or adjusted under 35 U.S.C. 154(b) by 471 days.

(21) Appl. No.: 12/425,145

(22) Filed: Apr. 16, 2009

(65) Prior Publication Data
US 2010/0266424 A1   Oct. 21, 2010

(51) Int. Cl.
*F04F 5/48* (2006.01)
*B64D 25/14* (2006.01)
(52) U.S. Cl. ..................................... 417/191; 244/137.2
(58) Field of Classification Search .................. 417/191, 417/189, 198, 151, 179; 244/137.2; 441/41
See application file for complete search history.

(56) References Cited

U.S. PATENT DOCUMENTS

| | | | |
|---|---|---|---|
| 2,772,829 A | 12/1956 | Crawford et al. | |
| 3,042,290 A | 7/1962 | Fraebel | |
| 3,468,472 A * | 9/1969 | Hahn | 417/191 |
| 3,771,913 A * | 11/1973 | MacPherson et al. | 417/179 |
| 4,368,009 A | 1/1983 | Heimovics, Jr. et al. | |
| 4,412,568 A | 11/1983 | Hughes | |
| 5,002,465 A | 3/1991 | Lagen et al. | |
| 6,071,084 A | 6/2000 | Wass et al. | |
| 2008/0272580 A1 | 11/2008 | Breed | |

* cited by examiner

*Primary Examiner* — Joseph L Williams
(74) *Attorney, Agent, or Firm* — Jerry J. Holden; John D. Titus

(57) ABSTRACT

An aspirator for inflating an aircraft evacuation slide, emergency raft or other inflatable device includes a flexible, collapsible aspirator barrel that is inflated during operation to form a substantially rigid tube. According to one embodiment, the inflatable support member receives a flow of high pressure air directly from the aspirator injector nozzle assembly. According to another embodiment, the collapsible aspirator barrel receives a flow of high pressure gas directly from the high pressure inflation source. Because the aspirator barrel of the present invention is collapsible, the present invention occupies significantly less space when stored than an equivalent aspirator with a rigid aspirator barrel.

17 Claims, 7 Drawing Sheets

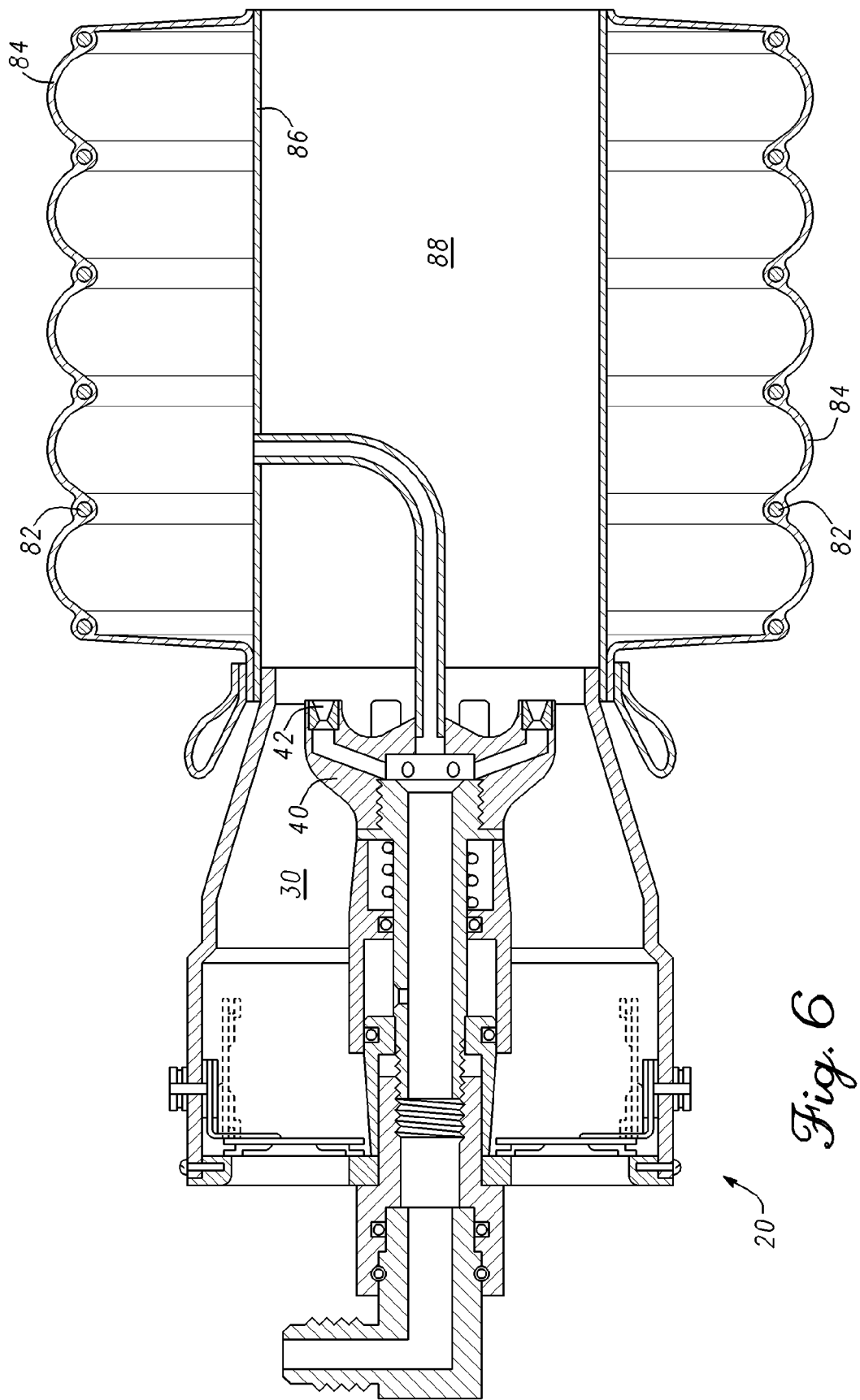

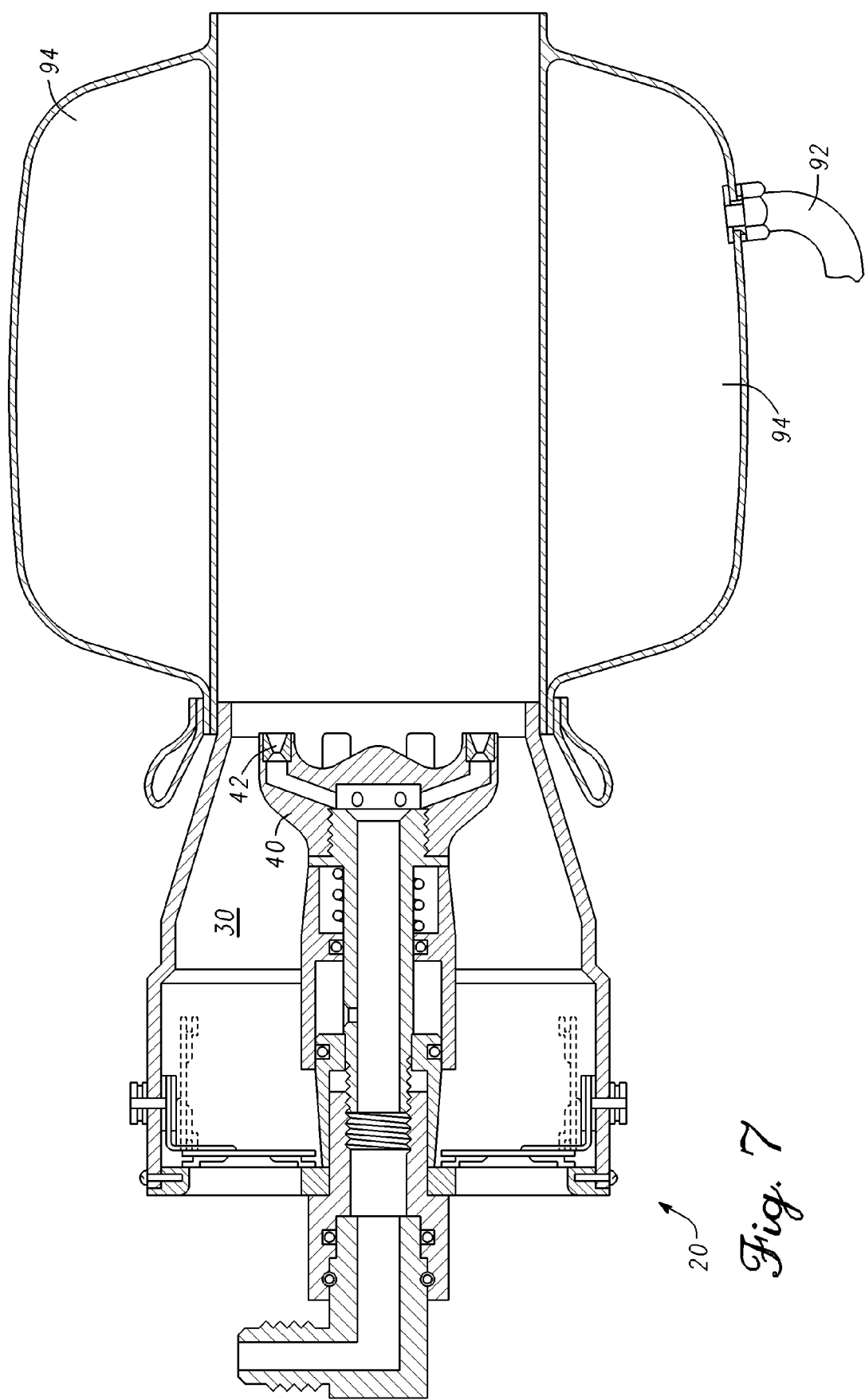

US 8,066,493 B2

INFLATION ASPIRATOR WITH COLLAPSIBLE BARREL

BACKGROUND OF THE INVENTION

This invention relates generally to apparatus for inflating devices, in particular to apparatus for inflating aircraft emergency evacuation slides and rafts.

Aircraft emergency evacuation slides, emergency life rafts and similar devices are typically stored in a packed configuration occupying as little space as possible for long periods of time. When called upon for use, these inflatable devices are typically inflated to a relatively low pressure, on the order of 2-3 psig for conventional aircraft evacuation slides up to approximately 7-8 psig for advanced high pressure lightweight evacuation slides. The requirement that the inflatable device in its packed condition occupy a minimum volume dictates that the inflation source comprise a volume of gas stored in a high pressure container, a pyrotechnic gas generator, or a hybrid inflator comprising a pyrotechnic gas generator in combination with a quantity of gas stored at high pressure.

Because the aforementioned high pressure inflation sources exhaust a volume of gas at a pressure substantially higher than the inflation pressure of the inflatable device, it is common to use an aspirator to draw atmospheric air into the inflatable device during inflation to augment the high pressure gas flowing into the inflatable device. In the operation of an aspirator, one or more nozzles act as gas injectors, injecting a jet stream of gas at high velocity into the inlet end of an aspirator barrel. The flow of air entering the aspirator barrel reduces the pressure at the inlet end to below atmospheric pressure. Atmospheric air, therefore, enters the aspirator body to be entrained with the jet stream entering the aspirator barrel. The outlet of the aspirator barrel communicates with the interior volume of the inflatable device so that jet stream and the entrained air collectively make up the volume of gas filling the inflatable device.

Because the aspirator barrel must be capable of operating at sub-atmospheric pressure without collapsing, aspirators are conventionally equipped with rigid aspirator barrels. Although a rigid aspirator barrel adequately performs the function of entraining atmospheric air into the jet stream produced by the injector nozzle(s) a rigid aspirator barrel adds significant weight and storage volume to the inflatable device. U.S. Pat. No. 5,002,465 to Lagen et al. and U.S. Pat. No. 6,071,084 to Wass et al. suggest aspirators having telescoping aspirator barrels. Although a telescoping aspirator barrel reduces the storage volume of the aspirator to some extent, a telescoping aspirator barrel typically collapses by only about 20% or less and, therefore, 80% or more of the length of the rigid aspirator barrel remains to be stored in the limited volume for storage of the inflatable device.

SUMMARY OF THE INVENTION

The present invention comprises an aspirator having a flexible, collapsible aspirator barrel. According to an embodiment of the invention, the collapsible aspirator barrel comprises an inflatable support member that is inflated to form a substantially rigid tube. According to one illustrative embodiment, the inflatable support member receives a flow of high pressure air directly from the injector nozzle assembly. According to another illustrative embodiment, the collapsible aspirator barrel receives a flow of high pressure gas directly from the high pressure inflation source. Because the aspirator barrel of the present invention is collapsible, the present invention occupies significantly less space when stored than an equivalent aspirator with a rigid or a telescoping aspirator barrel.

BRIEF DESCRIPTION OF THE DRAWING

The present invention will be better understood from a reading of the following detailed description, taken in conjunction with the accompanying drawing figures in which like references designate like elements and, in which:

FIG. 6 is another alternative embodiment of an aspirator incorporating features of the present invention; and FIG. 7 is yet another alternative embodiment of an aspirator incorporating features of the present invention.

DETAILED DESCRIPTION

Figure 1:
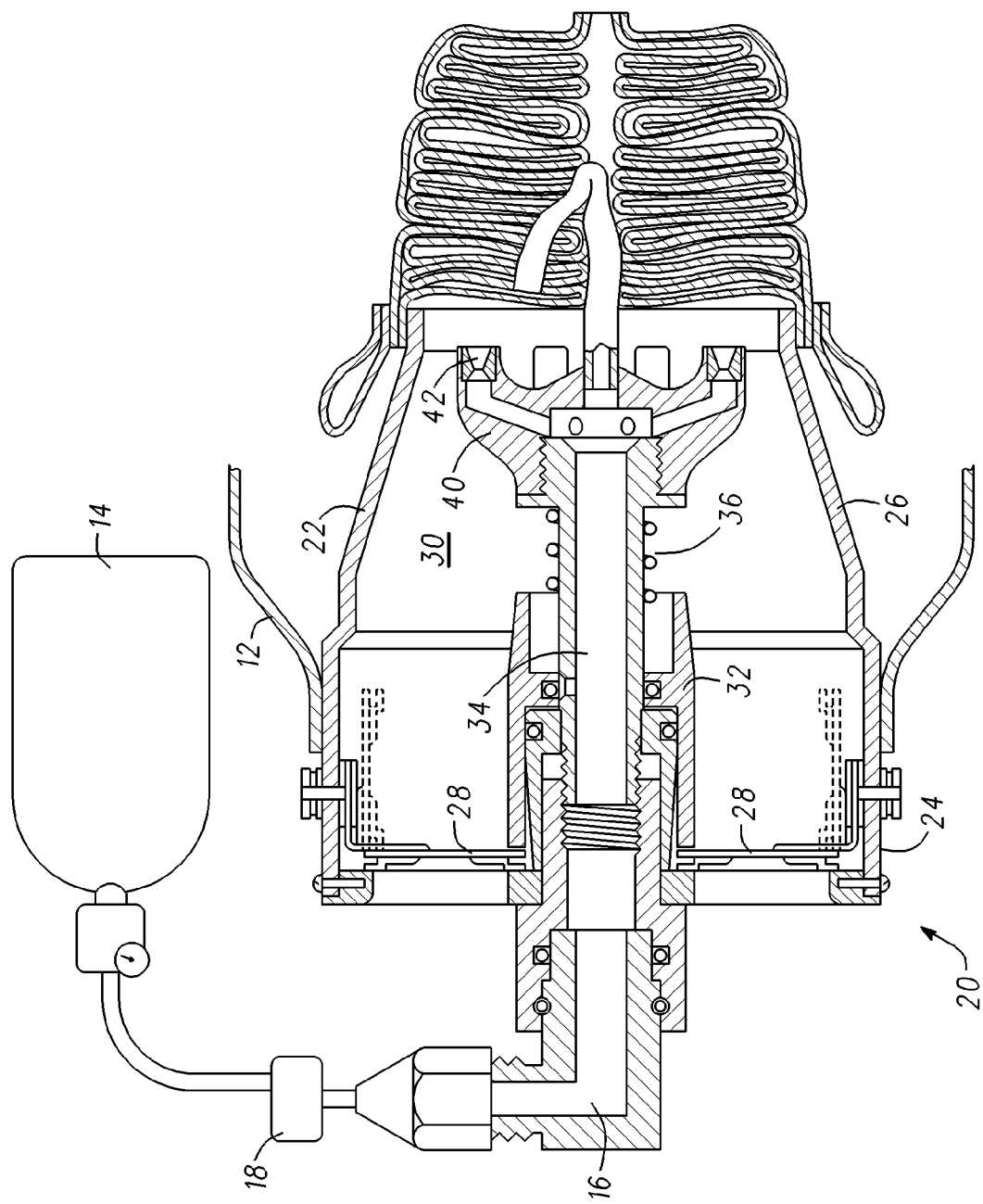
FIG. 1 is cross-sectional view of an inflation system including an aspirator incorporating features of the present invention shown in its stowed condition.

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

With reference to FIGS. 1-4, an inflation system 10 for inflating an inflatable device 12 comprises an inflation source 14, which may be a pressure vessel containing gas under a relatively high pressure, a pyrotechnic gas generator, a hybrid inflator comprising a pyrotechnic gas generator and a stored compressed gas or any other suitable source of inflation gas. Inflation source 14 is fluidically connected to inlet port 16 of aspirator 20 via a control valve shown schematically as reference 18 in FIG. 1.

Aspirator 20 comprises a housing 22, which in the illustrative embodiment comprises an upstream portion 24 of substantially rectangular cross-section converging to a downstream portion 26 of substantially circular cross-section. Upstream portion 24 of housing 22 includes a plurality of check valves 28 comprising rectangular flaps that are hinged to allow the atmospheric air to flow into the interior volume 30 of housing 22 when the pressure in interior volume 30 is sub-atmospheric. Check valves 28 are biased toward the closed position to prevent air escaping interior volume 30 of housing 22 when the pressure in interior volume 30 is equal to or greater than atmospheric pressure.

Aspirator housing 22 can be constructed of any suitable material such as metal, plastic or the like, but in the illustrative example of FIG. 1, housing 22 is formed of a reinforced plastic. In typical installations, housing 22 is mounted to inflatable device 12 so that all or a substantial portion of housing 22 extends into the inflatable device 12 through an opening in the inflatable device 12 for that purpose.

Aspirator 20 may optionally be equipped with a slide valve 32, which moves away from check valves 28 to allow them to open when the pressure in channel 34 is sufficiently high. When pressure in channel 34 falls below a pre-determined threshold indicating the inflatable device 12 is substantially near its full inflation pressure, spring 36 urges slide valve 32 against check valves 28 to lock them in their closed positions.

Aspirator 20 further comprises a nozzle assembly 40 comprising a plurality of individual nozzles 42 for directing high velocity jets of gas into the intake end 44 of aspirator barrel 46. Aspirator barrel 46 comprises a plurality of tubular support members 48, which in the illustrative embodiment are formed by attaching (e.g., stitching together or bonding) an outer sleeve 50 and an inner sleeve 52 to with a plurality of webs 56 which run in a longitudinal direction relative to a flow of gas through the inner lumen 54 of aspirator barrel 46.

Outer sleeve 50, inner sleeve 52 and webs 56 of aspirator barrel 46 are preferably fabricated from an air impervious material such a lightweight fabric that has been coated with an elastomer such as rubber or urethane. The various parts of the aspirator barrel 46 form a unitary composite structure capable of maintaining its shape during operation. The entire structure of the aspirator barrel 46 is preferable formed such that all of the chambers 56 comprising the structure are interconnected pneumatically, such that a single pressurized gas source may be utilized for its deployment.

Aspirator barrel 46 further comprises a conduit 58 which interconnects the chambers 56 of tubular support members 48 to nozzle assembly 40. Conduit 58 preferably comprises an off-the-shelf reinforced elastomeric high pressure hose, but may be made of any suitable material capable of withstanding inflation pressures present in nozzle assembly 40. For example, conduit 58 may comprise a reinforced fabric sleeve coated with an elastomer similar in construction to the tubular support members 48. Aspirator barrel 46 is secured to housing 22 by means of a plurality of fabric loops 60 which are secured to the downstream portion 26 of housing 22. Alternatively, aspirator barrel 46 may be attached to housing 22 by means of a dedicated flange similar in construction to flange 62 which secures housing 22 to the inflatable device 12.

Figure 2:
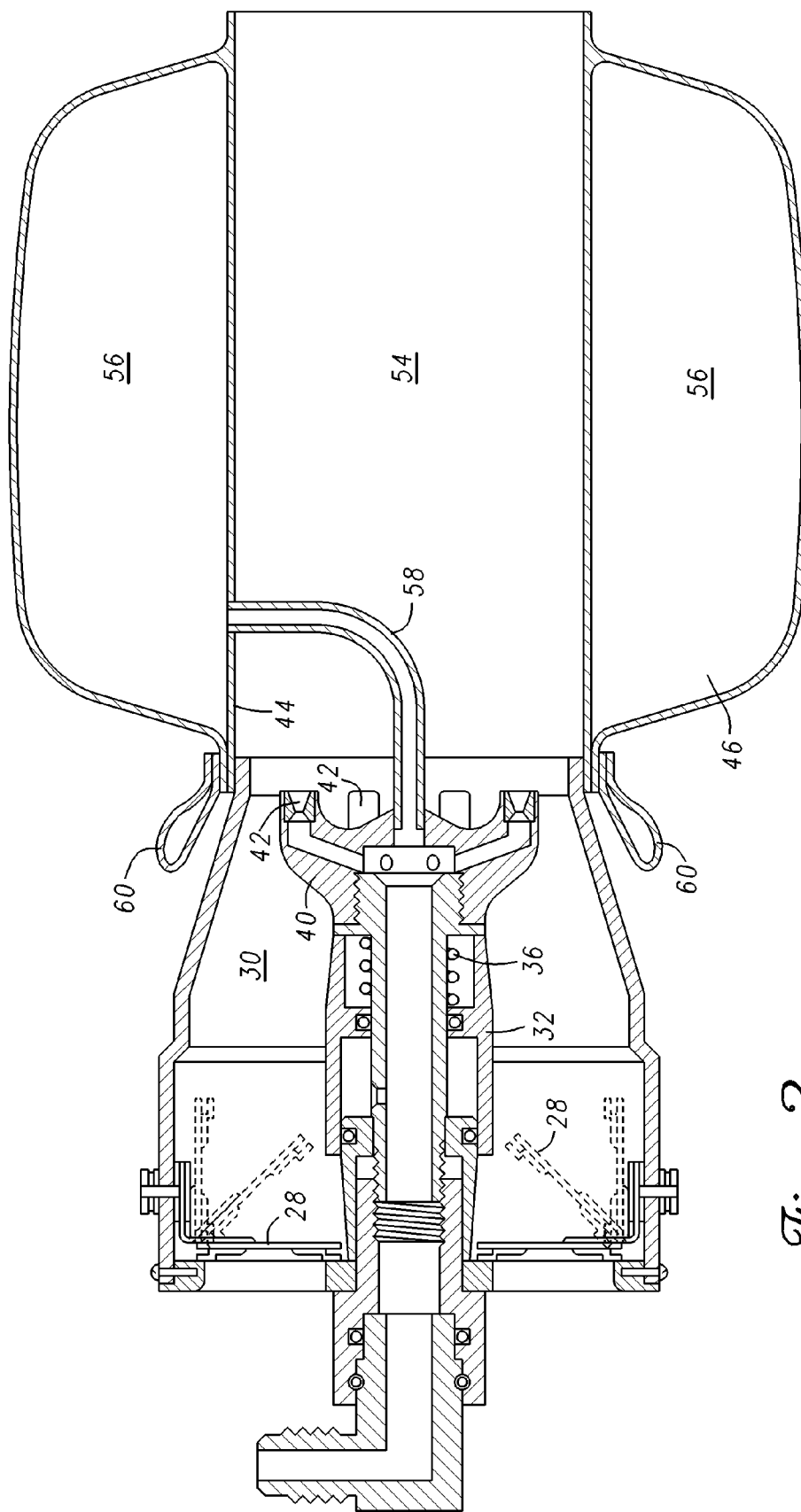
FIG. 2 is the aspirator of FIG. 1 shown in its deployed condition.
Figure 3:
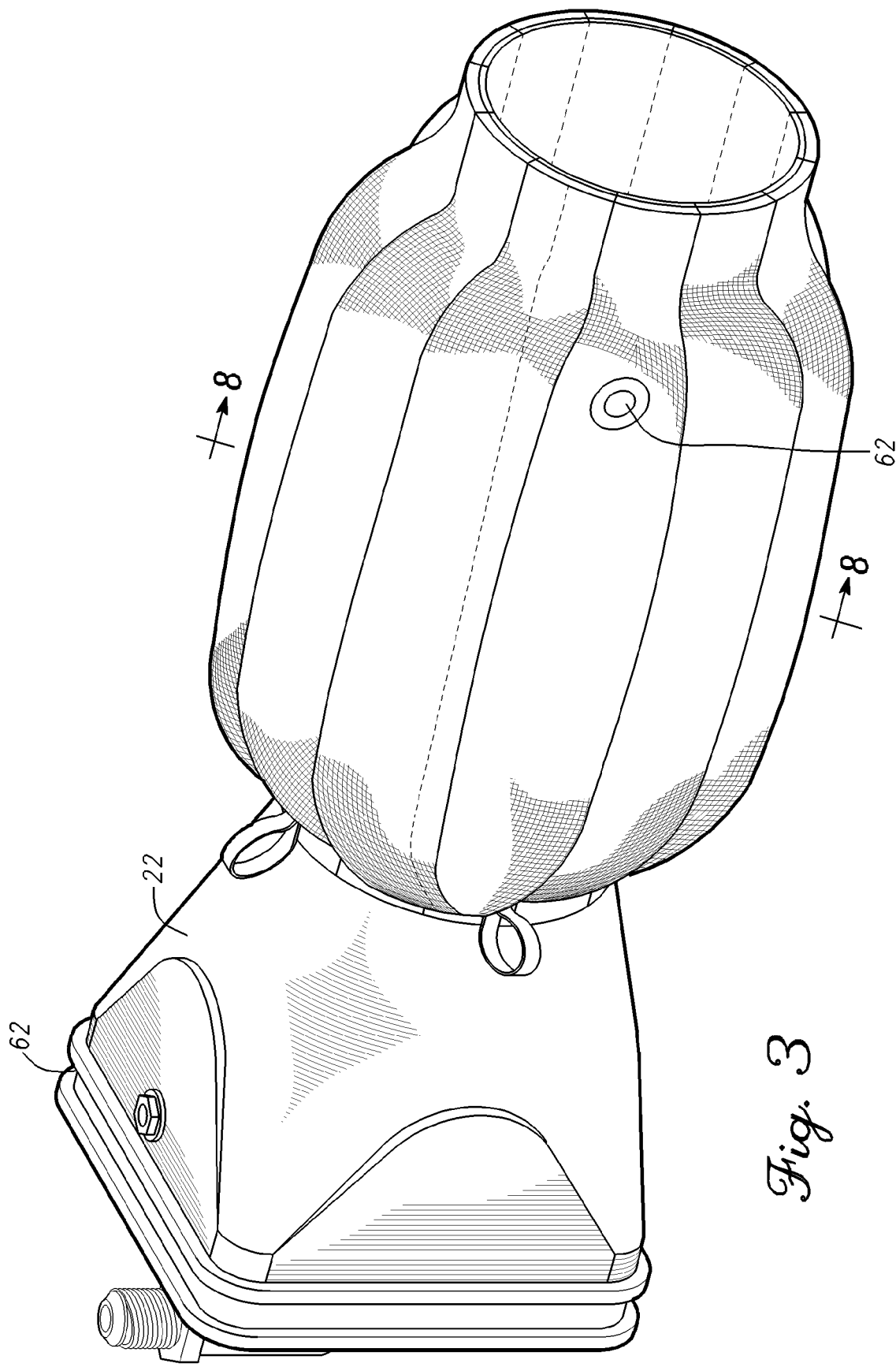
FIG. 3 is a perspective view of the aspirator of FIG. 1 in its deployed condition.
Figure 4:
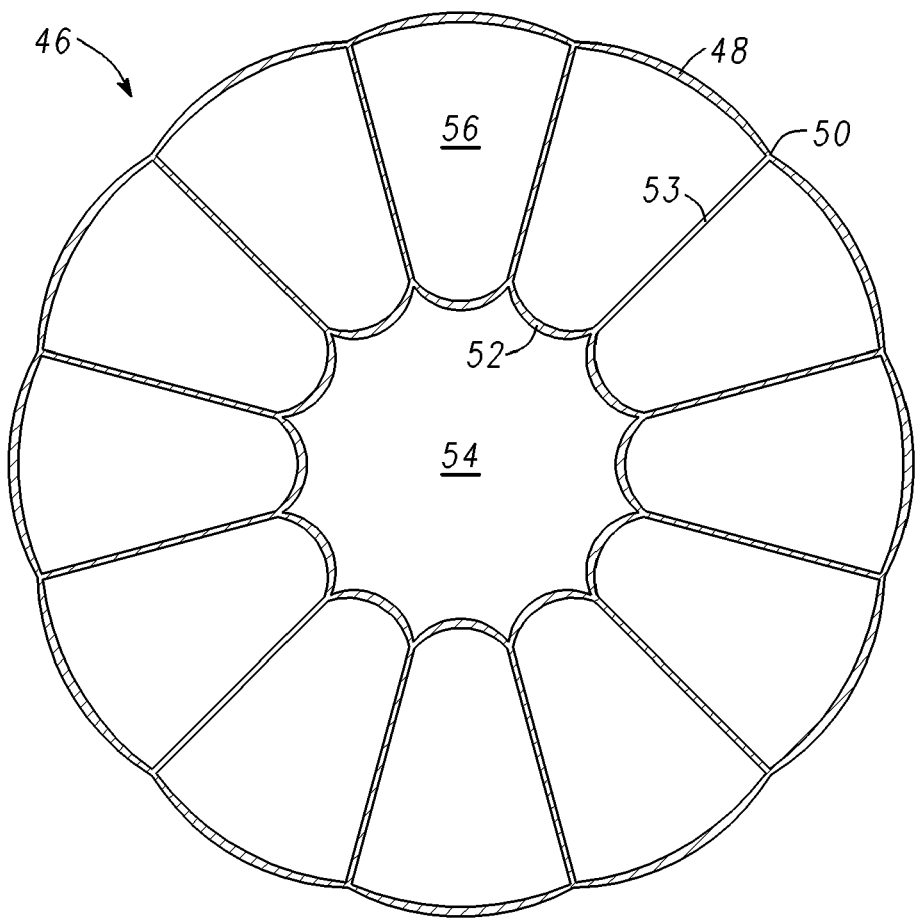
FIG. 4 is a cross-sectional view of the aspirator of FIG. 3 taken along line 4, 4.

In operation, high pressure gas from inflation source 14 enters the aspirator through inlet port 16 and exits through nozzles 42 of nozzle assembly 40 into intake end 44 of aspirator barrel 46. Simultaneously, high pressure gas from inflation source 14 flows from nozzle assembly 40 through conduit 58 into chambers 56 of aspirator barrel 46 causing aspirator barrel 46 to deploy from its stowed condition as shown in FIG. 1 to its deployed condition as shown in FIG. 2. Because aspirator barrel 46 is exposed to the full inflation pressure present in nozzle assembly 40, aspirator barrel 46 may be equipped with one or more pressure relief valves 62 to prevent overpressurization and consequential distortion or rupturing of aspirator barrel 46.

The large ratio of nozzle periphery to cross-sectional area of nozzles 42 is sufficient to induce a flow of ambient air from interior volume 30 of housing 22 into inner lumen 54 of aspirator barrel 46. This induced airflow will in turn cause the pressure in interior volume 30 and at least a portion of inner lumen 54 to drop below atmospheric pressure. The pressure of atmospheric air on the check valves 28 causes them to swing inwardly toward an open position, permitting the atmospheric air to enter housing 22 to become entrained with the high velocity flow of gas exiting nozzles 42.

The multiple chamber structure of aspirator barrel 46 enables it to be substantially rigid and therefore to maintain the shape of interior lumen 54 notwithstanding the sub-atmospheric pressure and pressure fluctuation within interior lumen 54. As shown in FIG. 2, in order for the induced flow of air to be sufficient to entrain substantial atmospheric air, the ratio of the length of the interior lumen 54 to its effective diameter is at least 1.0 preferably at least 1.5 and is typically between 1.5 and 3.0 for a maximum efficiency. (Because interior lumen 54 is not perfectly cylindrical, as used herein, "effective diameter" is the diameter of a circle of equal flow area, i.e., the cross-sectional area of interior lumen 54 divided by $\pi$). As noted herein, aspirator barrel 46 in its deployed condition is substantially rigid in that it is capable of maintaining the shape of inner lumen 54 in spite of sub-atmospheric pressure and/or pressure fluctuations in inner lumen 54 that would cause a flexible conduit to collapse and/or flutter, thus stalling the air stream and reducing the aspirator efficiency.

During the major portion of the operation of aspirator 20, the jet stream flowing from the nozzles will have sufficient velocity to induce a flow of atmospheric air past check valves 28. When, however, the pressure at the source is reduced and the velocity of the gas exiting the nozzles falls, back pressure from the inflatable device 12 will cause the check valves 28 to close. Since the pressure of the inflation source 14 will still be above the pressure in the inflatable device 12, gas will continue to flow from nozzles 42 to increase the pressure in the inflatable device without the addition of any further entrained atmospheric air. The final pressure of the inflatable device then may be limited by providing various pressure relief valves or other devices to limit the final inflation pressure.

Figure 5:
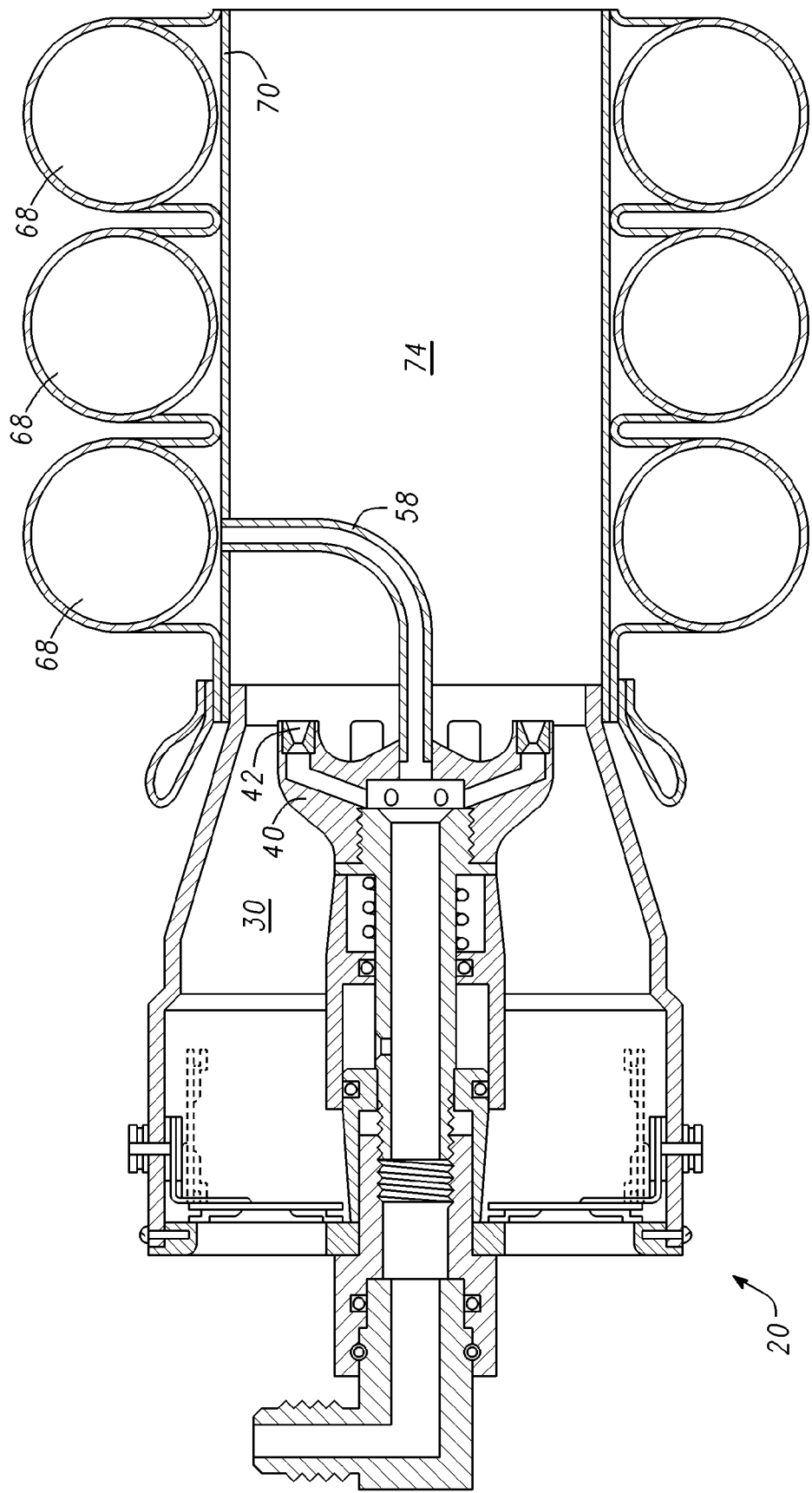
FIG. 5 is a cross-sectional view of an alternative embodiment of an aspirator incorporating features of the present invention.

Although the illustrative embodiment of FIGS. 1-4 contemplate inflatable tubular support members 48 which are longitudinal with respect to a flow of gas through inner lumen 54, the present invention is not limited to a longitudinal support structure. An alternative embodiment as shown in FIG. 5 contemplates a plurality of torroidal support members 68 supporting an inner sleeve forming the outer wall of lumen 74. Torroidal support members 68 may comprise a plurality of individual torroidal support members interconnected by a common septum or may constitute a single helical torroid fluidically connected via conduit 58 to inflation source 14. Additionally, as shown in FIG. 6 the present invention is not limited to a collapsible aspirator barrel fabricated in entirely of fabric but may comprise a plurality of rigid supports such as hoops 82 formed of any suitable rigid material such as metal or plastic in combination with one or more fabric sleeves 84, 86 forming a structure that is inflated to expand from a stowed, collapsed condition to a deployed condition having sufficient rigidity to maintain the shape of interior lumen 88 as hereinbefore described. Finally, although the prior embodiments contemplate inflation of aspirator barrel 46 through a conduit 58 emanating from nozzle assembly 40, any source of high pressure inflation gas may be utilized without departing from the present invention, for example, as shown in FIG. 7, an external conduit 92 leading directly to inflation source 14 may be incorporated in lieu of conduit 58 for providing pressurized gas for inflating aspirator barrel 94.

Figure 8:
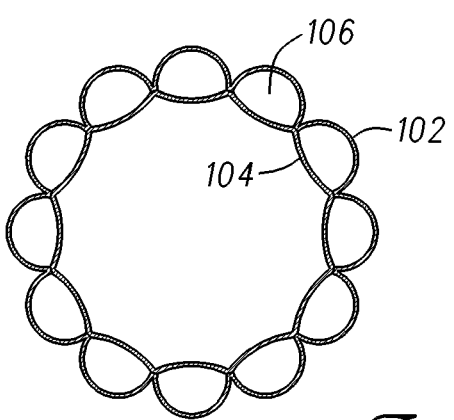
FIG. 8 is a cross-sectional view of yet another alternative embodiment.

Although certain illustrative embodiments and methods have been disclosed herein, it will be apparent from the foregoing disclosure to those skilled in the art that variations and modifications of such embodiments and methods may be made without departing from the invention. For example, although the illustrative embodiment of FIG. 4 comprises a plurality of tubular members formed by stitching a plurality of webs between an inner and outer sleeve, as shown in FIG. 8, outer sleeve 102 may be stitched directly to inner sleeve 104 to form a plurality of longitudinal tubular members 106 without departing from the scope of the present invention. Accordingly, it is intended that the invention should be limited only to the extent required by the appended claims and the rules and principles of applicable law. Additionally, as used herein, unless otherwise specifically defined, the terms "substantially" or "generally" when used with mathematical concepts or measurements mean within ±10 degrees of angle or within 10 percent of the measurement, whichever is greater.

What is claimed is:

1. In combination with an inflatable object such as an aircraft evacuation slide or raft, an aspirator for inflating the inflatable object comprising:
   a housing having an intake end and an exhaust end, the intake end including a check valve being moveable from an open position for admitting entrance of atmospheric air into said housing to a closed position for preventing air from escaping said housing;
   a collapsible aspirator barrel comprising an inflatable support member which, when inflated, expands to form a substantially rigid tube having an inner lumen with a first end operatively attached to the exhaust end of said housing and a second end operatively attached to an inlet port of the inflatable object, said collapsible aspirator barrel further comprising an inlet port adapted to receive a source of pressurized gas for inflating the inflatable support member; and
   a nozzle assembly disposed within said housing proximal the exhaust end of said housing, said nozzle assembly comprising an inlet capable of receiving a source of pressurized gas and an outlet comprising a nozzle exit directed into the first end of the inner lumen of said collapsible barrel.

2. The aspirator of claim 1, wherein:
   the inner lumen of said collapsible aspirator barrel has substantially the same cross sectional area as the exhaust end of said housing.

3. The aspirator of claim 1, wherein:
   said housing comprises a rigid structure formed of a reinforced plastic.

4. The aspirator of claim 1, wherein:
   the inner lumen of said collapsible aspirator barrel has a length to effective diameter ratio of at least 1.0.

5. The aspirator of claim 1, wherein:
   the inner lumen of said collapsible aspirator barrel has a length to effective diameter ratio of at between 1.5 and 3.0.

6. The aspirator of claim 1, wherein:
   said inflatable support member comprises a plurality of tubular members.

7. The aspirator of claim 1, wherein:
   said inflatable support member comprises a plurality of tubular members arranged longitudinally with respect to a flow of fluid through the inner lumen of said collapsible aspirator barrel from said housing into the inflatable object.

8. The aspirator of claim 1, wherein:
   the inner lumen of said collapsible aspirator barrel is capable of remaining open with sub-atmospheric pressure within said inner lumen.

9. The aspirator of claim 1, wherein:
   the inlet port of said collapsible aspirator barrel is fluidically connected to said nozzle assembly.

10. The aspirator of claim 1, wherein:
    the inlet port of said collapsible aspirator barrel and said nozzle assembly are fluidically connected to a common source of pressurized gas.

11. The aspirator of claim 1, wherein:
    the inlet port of said collapsible aspirator barrel is located within the inner lumen of said collapsible aspirator barrel.

12. The aspirator of claim 1, wherein:
    said inflatable support member comprises a plurality of elastomer-coated fabric tubular members.

13. The aspirator of claim 1, wherein:
    the inflatable member is an aircraft evacuation slide.

14. An aircraft evacuation slide system comprising:
    an inflatable evacuation slide comprising a plurality of inflatable tubular members supporting a slide surface;
    an aspirator for inflating the inflatable evacuation slide, said aspirator comprising a housing having an intake end and an exhaust end, the intake end including a check valve being moveable from an open position for admitting entrance of atmospheric air into the housing to a closed position for preventing air from escaping the housing;
    a collapsible aspirator barrel comprising an inflatable support member which, when inflated, expands to form a substantially rigid tube having an inner lumen with a first end operatively attached to the exhaust end of said housing and a second end operatively attached to an inlet port of the inflatable evacuation slide, said collapsible aspirator barrel further comprising an inlet port adapted to receive a source of pressurized gas for inflating the inflatable support member; and
    a nozzle assembly disposed within said housing proximal the exhaust end of said housing, said nozzle assembly comprising an inlet capable of receiving a source of pressurized gas and an outlet comprising a nozzle exit directed into the first end of the inner lumen of said collapsible barrel.

15. The aircraft evacuation slide system of claim 14, wherein:
    said inflatable support member comprises a plurality of elastomer-coated fabric tubular members arranged longitudinally with respect to a flow of fluid through the inner lumen of said collapsible aspirator barrel from said housing into said inflatable evacuation slide.

16. The aircraft evacuation slide system of claim 14, wherein:
    the inner lumen of said collapsible aspirator barrel has substantially the same cross sectional area as the exhaust end of the housing.

17. The aircraft evacuation slide system of claim 14, wherein:
    the inner lumen of said collapsible aspirator barrel has a length to effective diameter ratio of at least 1.5.

* * * * *